March 5, 1974 G. D. JAMES 3,795,587
OBTAINING INCREASED HEAD IN WATER SYSTEMS
Original Filed July 1, 1968
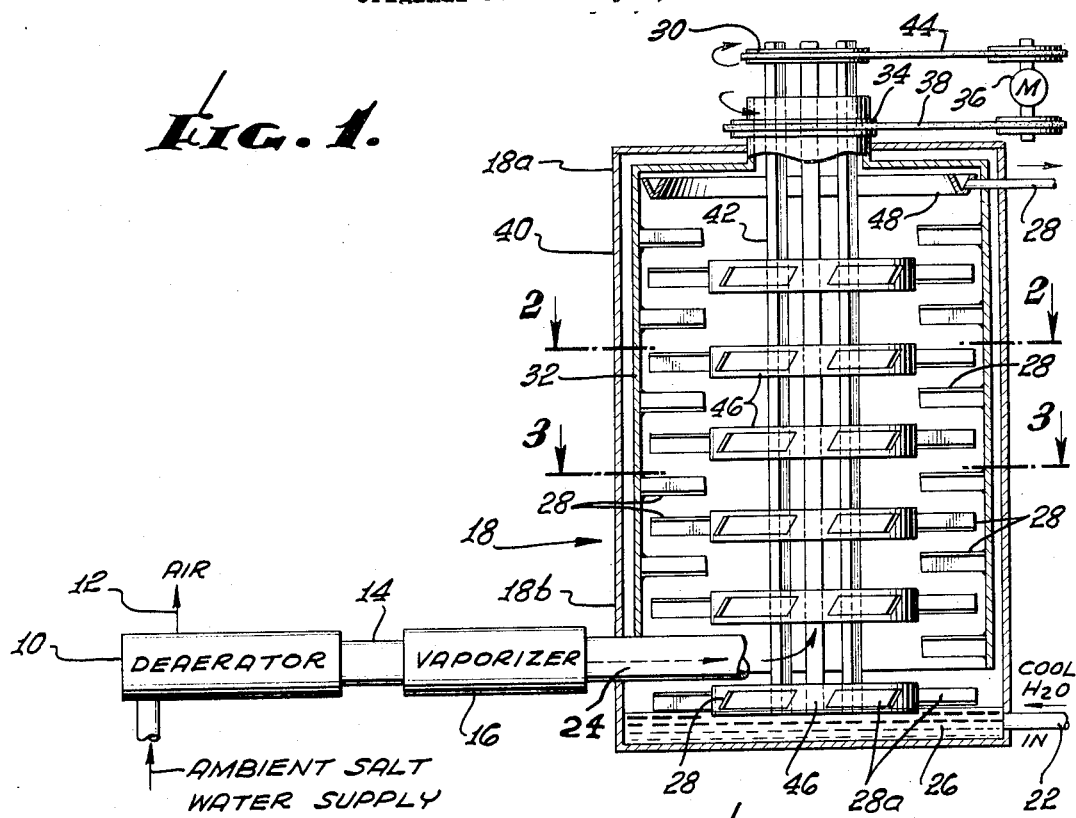
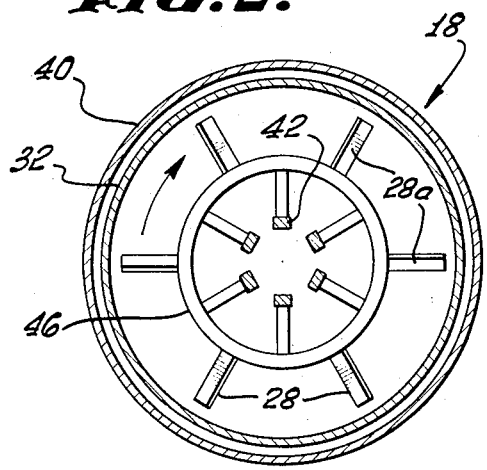
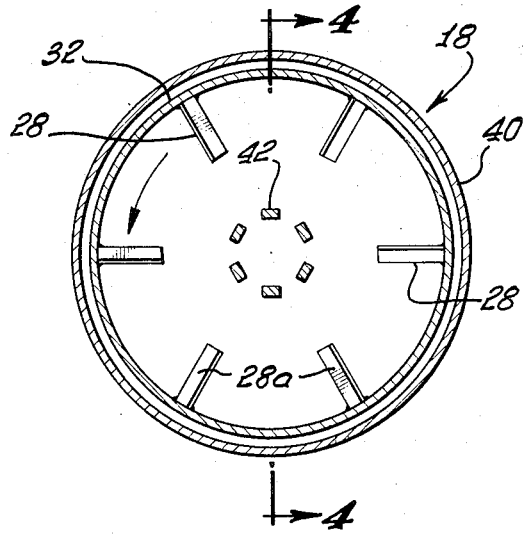
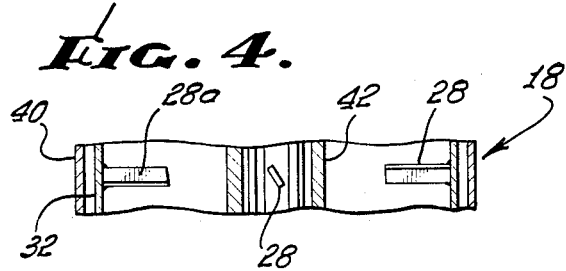
INVENTOR.
GLENN D. JAMES
By White & Haefliger
Attorneys.

United States Patent Office 3,795,587
Patented Mar. 5, 1974

3,795,587
OBTAINING INCREASED HEAD IN WATER SYSTEMS
Glenn D. James, 1200 Encino Ave.,
Arcadia, Calif. 91006
Continuation of abandoned application Ser. No. 741,662, July 1, 1968. This application July 19, 1971, Ser. No. 164,136
Int. Cl. B01d 3/10; F28b 5/00
U.S. Cl. 202—185 A                 4 Claims

ABSTRACT OF THE DISCLOSURE

In a water supply system in which water vapor is generated such as a desalinization system, head may be gained, useful in the generation of power, by combining condensation of the vapor with transport of condensing water to an elevated position. Thus driving relatively cool water droplets upward through a water vapor filled chamber and collecting the droplets and condensate at the top of the chamber provides an increase in water head to the system.

This application is a continuation of Ser. No. 741,662, filed July 1, 1968, now abandoned.

BACKGROUND OF THE INVENTION

(1) Field of the invention

This invention has to do with water obtention in one aspect and with generation of power in a second aspect. In the arid areas of the world, there is need for a supply of desalinated water. While various schemes have been proposed to meet this need, they have in common the elimination of salt from water through vaporizing the water and condensing. This vaporization is achieved generally through application of heat, derived from solar, mineral or nuclear sources, or more imaginatively through use of vacuum over the water supply.

In my copending application Ser. No. 551,595, filed May 20, 1966, and now U.S. Pat. No. 3,450,602, entitled Water Desalinization System, I have disclosed that ordinary seawater or other natural saline water supply may be vaporized without input of heat through application of vacuum. As there proposed such water may be dearated and vaporized by lowering water surface pressure to 28 mm. Hg or less. There results a vaporization of the water or "steam" at much lower temperatures than are typically associated with steam. Advantageously large heat inputs and thus both capital and operating expense are avoided. There is need for power however to run the vacuum pumps and possibly for other purposes such as lighting or manufacturing operations in nearby areas. Particularly in remote or underdeveloped areas where power resources are limited, there is a need for both water and power. The present invention meets this need in a remarkably flexible way.

(2) Prior art

As will be apparent from the discussion to follow, in this invention increased head usable for power generation is obtained integrally with the condensation of water vapor. Numerous expedients for the condensation of water vapor have been disclosed in the art. It is believed this application, however, discloses the first coherent system for obtaining power and condensation simultaneously in a water supply system. Thus, expedients where water is contacted with water vapor through downward cascading or upward jetting without collecting the water at a higher than initial level are not useful to my purposes.

SUMMARY OF THE INVENTION

It is a major objective of the present invention to provide increased head in a water supply system, which head may be used for power generation.

In general method and apparatus are contemplated in the invention. The method for gaining head in a water supply system in which water vapor is generated includes according to the invention introducing the water vapor into a vertically extended zone and contacting the vapor with relatively cool water droplets moving through the zone condensing the vapor on the droplets, deflecting the droplets repeatedly upwardly in the zone and collecting the droplets with the condensate upon deflection to the top of the zone. The method further contemplates generating water vapor for introduction into the zone by subjecting relatively warm water to a reduced pressure. The water is typically introduced into the lower portion of the zone and is dispersed as droplets upwardly through the zone. Deflection of the droplets in an upward direction may be accomplished by sweeping the zone repeatedly with angularly disposed surfaces adapted to provide upward deflection of impacting droplets. The deflected droplet may be further deflected upward by impacting on a second superjacent surface. The deflection while always upward may have more or less of a horizontal component which is desirably varied from surface to surface which may be arranged so that the deflection angle of the droplets may vary from surface impact to surface impact. In a particular case the vertically adjacent pairs of surfaces are angularly moving in opposing directions.

Apparatus is provided for carrying out the method including in the vapor generating water system a vertically elongated chamber having a water outlet at its upper extent, a water inlet at the lower extent and a water vapor inlet therebetween, means for dispersing water entering the chamber into droplets and means for deflecting the droplets upwardly in condensing contact with water vapor in the chamber progressively to the chamber upper extent and means collecting the droplets and condensate from the chamber upper extent. The chamber which is in open communication with the water vapor generator may contain a deflecting means which includes a plurality of moving vanes disposed at an angle to the horizontal to upwardly deflect droplets impacting on their surfaces. The attitude of the vanes is preferably at an angle between 20° and 60° with the horizontal. The chamber may be circular in horizontal section and have the deflecting vanes radially arranged therein e.g. carried on a vertical series of rotatable annular members alternate ones of which may rotate oppositely.

BRIEF DESCRIPTION OF THE DRAWINGS

FIG. 1 is a partly schematic view showing an embodiment of the present apparatus in section;

FIGS. 2 and 3 are horizontal sectional views taken on lines 2—2 and 3—3 respectively in FIG. 1; and FIG. 4 is an enlarged vertical sectional view taken on line 4—4 in FIG. 3.

DESCRIPTION OF THE PREFERRED EMBODIMENTS

The present method and apparatus are generally useful where there is a need to convert gas into a liquid and to gain head or where heat transfer or air removal problems from a liquid are encountered. Basically, I have found that lifting water droplets by a series of impacts against suitably inclined surfaces, preferably traveling in successively opposite directions the following advantages accrue:

(1) Metal-to-metal contact is not required in the liquid zone; thus pumps are avoided with their tolerance problems, nozzle plugging, and wear and heat transfer characteristics.

(2) Exceptionally long exposures of gas to liquid are achieved. Droplet velocity is slow; very favorable heat transfer conditions are realized, both through the duration of exposure and the constant freshening of the droplet surfaces, as will be described.

(3) Minimal heat differential. Assuming a cooling rate proportioned to temperature difference the method and apparatus herein described should provide condensation with a differential between liquid and vapor of only 0.5° F. or less as compared with other systems requiring an 8° F. differential. This advantage is realized because water vapor (steam) is condensed, without intervening metal, i.e. upon water droplets which are practically suspended by the process of repeated stopping, starting and agitating deflection enabling meaningful yields with very small temperature differences.

Turning now to the drawings, in FIG. 1 water from an ambient saline supply (not shown) such as a salt water lake or a sea, ocean or other thermal saline reservoir is drawn into a deaerator 10 which is basically a vacuum chamber with air being exhausted at 12. The deaerated water is taken along line 14 to a vaporizer chamber 16 which is a vacuum chamber operated at a pressure level not greater than the vapor pressure of the water taken in, causing boiling of the water. Thus steam (or water vapor) is achieved by a reduction in pressure rather than by heat input. Heat input could be used, but only at greatly increased cost. The steam from chamber 16 is carried to the lifting and condensing chamber 18.

The chamber 18 is central to the present apparatus for gaining head in a water supply system. The chamber 18 is vertically elongated and has a water outlet 20 at its upper extent 18a and a water inlet 22 at its lower extent 18b. Between the water inlet 22 and outlet 20, a water vapor inlet 24 is provided. This vapor inlet 24 leads from vaporizer chamber 16 and may be introduced into chamber 18 anywhere but for maximum efficiency is located as shown in FIG. 1.

Means are provided for dispersing water 26 entering the lifting chamber 18 through water inlet 22. Thus lowermost of vanes 28 are arranged relative to the water inlet 22 to skim the surface of water 26, sheeting the same and, as the water leaves the upper edge of vane forward surfaces 28a, dispersing the water into droplets.

Means are provided for deflecting the water droplets upwardly in condensing contact with water vapor in the chamber 18, progressively to the chamber upper extent 18a. With reference to FIGS. 1–3 the deflecting means is illustrated to take the form of a plurality of moving vanes 28 disposed at an angle to the horizontal to upwardly deflect droplets impacting on their surfaces 28a. As best shown in FIG. 4 the vane impacting surfaces 18a generally will lie at about a 30° angle with the horizontal, but may lie at an angle between 20° and 60° with due allowance being made for closeness of spacing of vertically successive vanes 28 to enable impacting of upwardly deflected droplets by the next series of vanes. For example, where the disposition of the vane surfaces 28a is 30° to the horizontal it will be desirable to have a 5 to 6 inch vertical spacing between successive series of vanes.

Vanes 28 may be arranged radially within chamber 18 as shown in FIGS. 2–3. In this arrangement four, six, eight, ten or more vanes extend along a radius of the chamber 18. The vanes 28 extend in cantilever fashion supported from one end into the chamber space, which in operation is filled with water vapor from vapor inlet 24 and water droplets dispersed by lowermost of vanes 28.

Vanes 28 are supported by shaft structure extending vertically through the chamber 18. An outer shaft structure 32 driven at 34 by motor 36 and belt 38 extends downwardly adjacent the chamber wall 40 for rotation coaxially with the wall on bearing means not shown. Vanes 29 extend inwardly from outer shaft structure 32 as best shown in FIG. 3. The outer shaft structure 32 may be cylindrical, as shown, or comprise a plurality of vertical members circumferentially spaced about circular horizontal members. The vanes 29 may be supported on the shaft structure 32 or on members supported by the shaft structure.

An inner shaft structure 32 is also provided drivably connected at 30 through belt 44 to motor 36 for axial rotation within chamber 18. In the arrangement shown in the drawings, the outer and inner shaft structures 32 and 42 respectively are oppositely driven for purposes to appear. The inner shaft 42 comprises six vertical members circularly arranged about the chamber axis and supported in their relation by a series of annular bands 46 from each of which a radial series of vanes 28 project. See FIG. 2.

At the upper extent 18a of the lifting chamber collector 48 is provided in communication with water outlet 20. Collector 48 comprises, upwardly open troughs or other water collecting means which catch water droplets driven to the lifting chamber upper extent 18a. These droplets comprise the droplets dispersed by lowermost vanes 28 plus the condensed accretion of water vapor gained in the passage of the droplet through the chamber 18 driven by the series of vanes.

Vanes 28 may be swept back or forward at their ends to vary the velocity thereof and overcome variations along the vane. Similarly the pitch of the vane may be varied along its length to compensate for centrifugal effects on droplets trajectory.

The arrangement of vanes 28 and 29 is important in that for optimum operation the droplets must have long exposure time to the water vapor, to maximize condensation opportunity; and heat transfer conditions must be optimized. These characteristics may be achieved by providing a long path through the chamber for the droplets. While this might be done by a continuous upward spiral of droplets as they are carried from one series of vanes to the next higher series, benefits in heat transfer are gained if the droplets are reversed in spin direction with successive impacts.

Thus it is preferred to reverse the direction of the lateral movement component of the droplets driven by the vanes 28, 29. This is achieved by driving the alternate series of vanes 28 and 29, respectively in opposite directions i.e. clockwise and counterclockwise. The shaft structures 32 and 42 it will be noted, carry these alternate series of vanes 28 and 29. Thus rotation of outer shaft 32 clockwise and rotation of inner shaft 32 counterclockwise achieves alternately opposite vane 28, 29 movement. Droplets formed at the lowermost of vanes 28, 29 are reversed in lateral direction component with the next series of vanes 28, 29 and so forth as they are driven higher by their deflection from the upwardly angled vane surfaces 28a and 29a. In addition, the reverse direction impact reforms the droplets whereby on leaving the vane surfaces 28a, 29a fresh heat exchange surfaces are provided, optimizing this aspect of the condensation process. The droplets additionally may rotate oppositely to their rotation at impact, enhancing heat exchange possibilities with the succession of spin reversals.

With the tortuous upward climb of the droplets much water vapor comes in contact therewith and is condensed thereon. The droplets thus at the upper chamber extent 18a carry vapor into collector 48 to provide a water supply at increased head.

The water to inlet 22 may be pulsed to vary the heat rise in the droplets, by varying the steam/water input ratio.

The device moreover may be operated without a vapor input where it is desired to only cool water while gaining head.

What is claimed is:

1. Apparatus for gaining head in a water supply system in which water vapor is generated which includes a vertically elongated chamber having a water outlet at its upper extent and a water inlet at its lower extent, means to pass water vapor into said chamber from without, means for dispersing water entering the chamber at said water inlet into droplets and means for deflecting said droplets upwardly in a manner providing condensing contact thereof with water vapor in the chamber and progressively to the chamber upper extent, said deflecting means comprising a vertical series of inner and outer rotatable members, and a plurality of radially arranged vanes carried circularly by said rotating members while disposed at an angle to the horizontal to upwardly deflect droplets impacting on their surfaces, and means at the chamber upper extent collecting the droplets and condensate thereon.

2. Apparatus according to claim 1 in which the impacting surface of the vanes lies at an angle between about 20° and 60° with the horizontal.

3. Apparatus according to claim 1 in which said chamber is circular.

4. Apparatus according to claim 1 in which said inner and outer members rotate oppositely.

References Cited

UNITED STATES PATENTS

| | | | |
|---|---|---|---|
| 3,135,466 | 6/1964 | Reid | 239—2 |
| 2,776,167 | 1/1957 | Koch | 239—14 |
| 3,450,602 | 6/1969 | James | 202—205 |
| 3,390,057 | 6/1968 | Day | 202—188 |
| 1,970,169 | 8/1934 | Godward | 261—12 |
| 3,490,996 | 1/1970 | Kelly, Jr. | 203—11 |
| 3,531,939 | 10/1970 | James | 203—11 |
| 990,121 | 4/1911 | Drake | 239—14 |

WILBUR L. BASCOMB, JR., Primary Examiner

U.S. Cl. X.R.

165—110; 203—11